United States Patent [19]
Cottam

[11] Patent Number: 4,599,646
[45] Date of Patent: Jul. 8, 1986

[54] METHOD AND APPARATUS FOR IDENTIFYING UNAUTHORIZED OR DEFECTIVE CONVERTER/DECODER BOXES IN CATV SYSTEM

[75] Inventor: Johnny L. Cottam, Plano, Tex.

[73] Assignee: D-Tec Industries, Inc., Plano, Tex.

[21] Appl. No.: 611,756

[22] Filed: May 18, 1984

[51] Int. Cl.$^4$ .................................... H04N 7/167
[52] U.S. Cl. ........................... 358/121; 358/118
[58] Field of Search ................. 358/118, 120, 121

[56] References Cited

U.S. PATENT DOCUMENTS

| | | |
|---|---|---|
| 3,760,097 | 9/1973 | Burroughs et al. |
| 4,064,536 | 12/1977 | Saeki et al. ............... 358/121 X |
| 4,097,894 | 6/1978 | Tanner et al. |
| 4,145,716 | 3/1979 | Uemura et al. |
| 4,148,063 | 4/1979 | Chomet . |
| 4,222,067 | 9/1980 | Stern et al. |
| 4,266,243 | 5/1981 | Shutterly . |
| 4,313,133 | 1/1982 | Fukushima ............... 358/121 X |
| 4,322,745 | 3/1982 | Saeki et al. |
| 4,336,553 | 6/1982 | den Toonder et al. |
| 4,353,088 | 10/1982 | den Toonder et al. ...... 358/121 X |
| 4,489,347 | 12/1984 | Tentler ...................... 358/118 |

FOREIGN PATENT DOCUMENTS

8303731 10/1983 PCT Int'l Appl. .............. 358/121

*Primary Examiner*—S. C. Buczinski
*Assistant Examiner*—Linda J. Wallace
*Attorney, Agent, or Firm*—Michael A. O'Neil; David H. Judson

[57] ABSTRACT

A head-end apparatus for a CATV system is provided for facilitating identification of unauthorized or defective converter/decoder boxes in the system. According to the invention, an IF audio signal, representing the aural portion of the program source to be transmitted, is applied to a scrambler which generates a scrambled IF audio signal having a scramble signal component. The scrambler has a synchronization rate set by a program source having a sync rate different than the sync rate of the program source to be transmitted. The scrambled IF audio signal is then combined with an IF video signal, representing the video portion of the program source to be transmitted, to produce a composite signal. The composite signal is then modulated to the desired CATV channel output frequency and transmitted to the user. In operation, an unauthorized or defective converter/decoder box in the CATV system injects the scramble signal component of the scrambled IF audio signal on the unscrambled video IF signal, thus scrambling a non-premium channel of a CATV system. When the user notifies the CATV system operator of the defective condition on the non-premium channel, an indication is provided that the converter/decoder box is either unauthorized or defective.

11 Claims, 3 Drawing Figures

METHOD AND APPARATUS FOR IDENTIFYING UNAUTHORIZED OR DEFECTIVE CONVERTER/DECODER BOXES IN CATV SYSTEM

TECHNICAL FIELD

The present invention relates generally to cable television (CATV) systems, and more particularly to a method and apparatus for identifying unauthorized or defective converter/decoder boxes in a CATV system.

BACKGROUND OF THE INVENTION

CATV systems having one or more "premium" channels allocated for controlled access are well known in the prior art. Typically, such systems include a channel modulator and a scrambler for each premium channel. The channel modulator receives a program source, converts this information to IF and then to a CATV output channel frequency. To control access to the premium channel, the video and audio IF carriers from the modulator are intercepted and further modulated in the scrambler with a scramble signal. Normally, the scramble signal is a 15.75 Hz sine wave which amplitude modulates the IF video and audio carriers. This additional modulation suppresses the horizontal synchronization information in the video signal, thus preventing acquisition of the premium channel at the user location unless the user has an appropriate converter/decoder box. Decoding of the premium channel is effected by a decode circuit in the user's converter/decoder box, which removes the 15.75 Hz signal from the audio carrier, phase shifts this signal by 180°, and uses the phase shifted version thereof to cancel the 15.75 Hz signal on the video carrier.

The user of the CATV system described above can easily defeat the decode circuit in the converter/decoder box, thus allowing unauthorized and unlimited access to premium channels. Such access is also provided when the converter/decoder box has a defective decode circuit. The existence of unauthorized and defective boxes in the CATV system is costly to the system operator who receives a fee for each premium channel. One prior art approach to solving this problem is the use of a secured decoder filter in the converter/decoder box. In particular, a narrowband filter is assembled on a fragile substrate and spring-loaded in a housing. Any attempt to open the decoder box shatters the substrate, thus destroying the filter to prevent reception of the premium channel. This technique, shown in U.S. Pat. No. 4,097,894 to Tanner et al, is costly since it requires complete replacement of the decoder filter circuitry.

There is therefore a need to provide an effective method and apparatus for identifying unauthorized or defective converter/decoder boxes in a CATV system which is inexpensive to the system operator and obviates destruction of the decode circuitry in the user box.

SUMMARY OF THE INVENTION

Accordingly, the present invention describes a head-end (transmit) appartatus for a CATV system for facilitating the identification of unauthorized and/or defective converter/decoder boxes. In operation, an IF audio signal, representing the aural portion of the program source to be transmitted, is applied to a scrambler whose synchronization rate is set by a program source different from the program source to be transmitted. A scrambled IF audio signal generated by the scrambler is then combined with an IF video signal, representing the video portion of the program source, to generate a composite signal. The composite signal is then converted to a CATV channel output frequency for transmission.

An unauthorized or defective converter/decoder box includes a continuously enabled decode circuit which operates to decode scrambled program source information from any CATV channel. Upon reception of the transmitted program source, the decode circuit interprets the scramble signal on the audio carrier as a command to decode all received signals. Accordingly, the scramble signal is removed by the decode circut, phase shifted and then applied to the unscrambled video carrier. A similar operation is performed on the scramble component of every other premium channel. Since the video carrier(s) do not include the scramble signal, one or more nonpremium channels are scrambled due to the operation of the decode circuit. Identification of the unauthorized or defective converter/decoder box is made when the user reports the scrambled picture on the non-premium channels.

BRIEF DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

Figure 1:
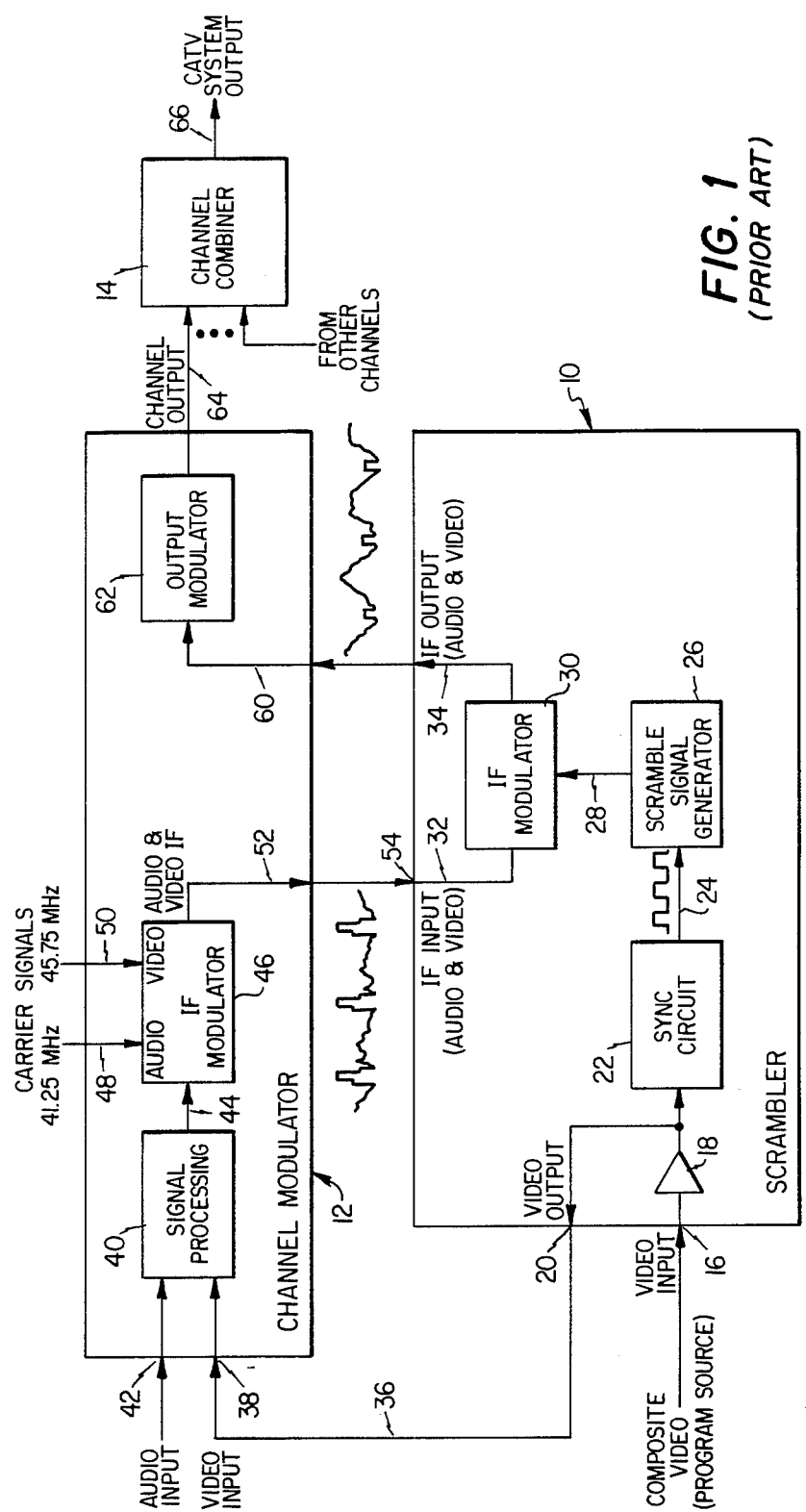
FIG. 1 is a block diagram of the head-end portion of a prior art CATV system for generating a premium channel.

With reference now to the FIGURES wherein like reference characters designate like or similar parts throughout the several views, FIG. 1 is a block diagram of the head-end portion of a prior art CATV system for generating a "premium channel" output. As is well known in the pior art, allocation of one or more "premium channels" in a CATV system requires encoding equipment to maintain security. Accordingly, the head-end portion of the CATV system in FIG. 1 includes a scrambler 10 which, in conjunction with a channel modulator 12, serves to scramble the "premium channel" program source information. Each premium channel source includes a separate scrambler and channel modulator such as shown in FIG. 1, and a channel combiner 14 is utilized to combine the channel output signals of the other premium, as well as non-premium channels. Although not shown in detail in FIG. 1, the CATV system includes a converter/decoder box located at each user location for producing a TV compatible signal and decoding the premium channel information. As will be described in more detail below, a signal processor may be utilized in place of the channel modulator 12.

The scrambler 10 includes a video input 16 for receiving a composite video; i.e. video containing horizontal and vertical synchronization pulses, representing the premium channel program source. The composite video is amplified in the scrambler 10 by the amplifier 18 and directed to the channel modulator 12 through the video output 20. The output of the amplifier 18 is also supplied to a synchronization circuit 22 which serves to remove and process the horizontal sync pulses from the composite video signal. The sync circuit 22 produces a shaped horizontal synchronization signal of frequency 15.75 Hz which is then applied via line 24 to a scramble signal generator 26. The horizontal sync signal triggers the generation of a 15.75 Hz sine wave scramble signal by the generator 26. The scramble signal generator 26 also generates a signal to cancel the scramble signal during the vertical retrace interval. The scramble signal is then reapplied via line 28 to an IF modulator 30 which receives an IF input, to be described below, via line 32. The scramble signal modulates this IF input to produce a scrambled IF signal, which is then output from the IF modulator 30 on line 34 and delivered back to the channel modulator 12.

Accordingly, in the prior art head-end section of a CATV system, the scrambler 10 receives a composite video program source and generates a horizontal synchronization signal therefrom. This horizontal synch signal is then used to generate a sine wave scramble signal which is applied to the IF modulator 30 to modulate an IF signal applied thereto.

Specifically, the amplified composite video signal is supplied from the video output 20 of the scrambler 10 via line 36 to the video input 38 of the channel modulator 12. As seen in FIG. 1, the channel modulator 12 includes a signal processing circuit 40 for receiving the composite video input and an audio signal via the audio input 42. The signal processing circuit 40 includes a frequency modulator for modulating a baseband audio input to RF, and appropriate mixing circuitry for mixing the audio input and the composite video signals. The output of the signal processing circuit 40 is applied via line 44 to an IF modulator 46, which receives audio and video carrier signals via lines 48 and 50, respectively. Specifically, an audio carrier signal of frequency 41.25 mHz is applied to the IF modulator 46 via the line 48. Likewise, a video carrier signal of 45.75 mHz is applied to the IF modulator 46 via line 50. The composite video and audio signals are then raised to these intermediate frequencies.

To prevent general access to the CATV premium channel, the IF audio and video signals output from the IF modulator 46 are intercepted and delivered to the scrambler 10 prior to transmission. Specifically, the output of the IF modulator 46 is applied via line 52 to the IF input 54 of the scrambler 10. The input 54 comprises a single input terminal for receiving a composite IF audio and video signal; or alternatively two input terminals for receiving separate IF audio and video signals from the modulator. The IF audio and video signals are then applied to the IF modulator 30 via the line 32 where the 15.75 Hz scramble signal further modulates these signals to produce a scrambled IF signal. As seen in the waveforms 56 and 58, the scramble signal serves to suppress the horizontal sync pulses in the video portion of the IF program source.

To complete the processing, the output of the IF modulator 30 on line 34 is then returned to the channel modulator 12 via the line 60. The scrambled IF signal is then modulated to a channel output frequency by an output modulator 62, with the output thereof on line 64 applied to the channel combiner 14. As noted above, the channel combiner 14 receives similar outputs of other premium and non-premium channels to provide the system output on line 66.

As is well known in the prior art, each of the converter/decoder boxes in the CATV system includes appropriate circuitry for converting a user-selected CATV channel to a channel which can be received by the TV set, usually Channel 3. In addition, the box can decode a premium channel by removing the scramble signal component from the video carrier which as discussed above, is inserted thereon by the IF modulator 30 in the scrambler 10. Specifically, the decode circuit in the converter/decoder box is enabled by the 15.75 Hz signal on the audio carrier. Once enabled, the decode circuit removes the scramble signal from the audio carrier, adds a 180° phase shift, and uses this signal to cancel the 15.75 Hz signal on the video carrier to decode the premium channel information.

Although such piror art CATV systems have proven reasonably secure, an unauthorized user can easily receive premium channel source information by opening the converter/decoder box and cutting a jumper cable to the decode circuit. Normally, the system operator provides one or more premium channels by cutting specific jumper wires in the box, rather than the jumper cable to the decode circuit. Once this jumper cable is cut, however, the decode circuit is continuously enabled, thus allowing unauthorized premium channel viewing. The decode circuit may also be continuously enabled because of some defect therein, also allowing free premium channel viewing. In either case, the CATV system operator is forced to bear the cost of providing unrestricted premium channel program information.

To ameliorate this problem, the method and apparatus of the present invention provides a unique encoding scheme at the head-end portion of the CATV system to facilitate the identification of unauthorized or defective converter/decoder boxes. Specifically, the method and apparatus operates to scramble one or more regular non-premium or "off-the-air" channels, although the user can still view "premium channel" information. "Identification" of an unauthorized or defective converter/decoder box occurs when the user notifies the CATV system operator that one or more or "off-the-air" channels are unviewable.

Figure 2:
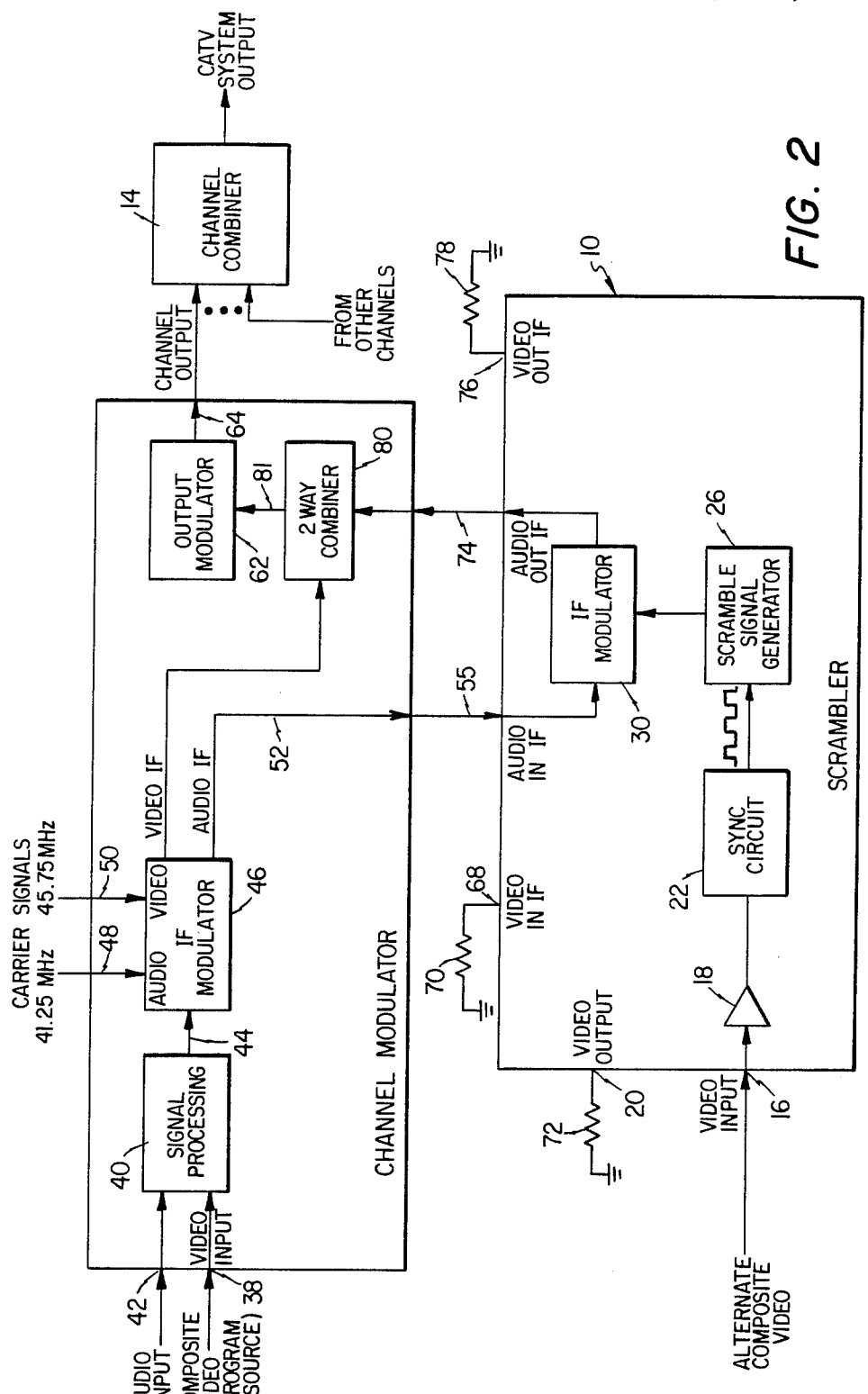
FIG. 2 is a block diagram of a head-end portion of the CATV system of the present invention for facilitating the identification of unauthorized and/or defective converter/decoder boxes.

Referring now FIG. 2, a block diagram of the head-end portion of the CATV system according to the present invention is shown. Contrary to the circuit of FIG. 1, where the composite video to be transmitted is applied to the scrambler 10 and the channel modulator 12, the composite video is only applied to the channel modulator 12. Specifically, this premium channel program source is applied to the video input 38 of the channel modulator 12 where it is mixed in the signal processing circuit 40 with the audio signal input via the audio input 42. According to an important feature of the present invention, the scrambler 10 receives an alternate program source; e.g. a composite video source for a different channel, at the video input 16. As discussed above with respect to FIG. 1, the composite video source applied to the video input 16 of the scrambler 10 serves to set the horizontal synchronization rate of the scrambler 10. According to the present invention, the horizontal sync rate of the alternate composite video input to the scrambler 10 is different than the horizontal sync rate of the composite video program source applied to the channel modulator 12.

Referring back to FIG. 2, the output of the signal processing circuit 40 is then applied to the IF modulator 46 via the line 44, where this signal is modulated by the carrier signals to produce IF audio and video signals. According to another important feature of the present invention, rather than applying both IF audio and video signals to the scrambler 12, as in the FIG. 1 embodiment, only the IF audio signal is applied to an IF audio terminal 55 via line 52. An IF video input terminal 68 is grounded through the resistor 70. Likewise, since the alternate composite video is not supplied to the channel modulator 12, the video output 20 of the scrambler 10 is grounded through the resistor 72.

Therefore, according to the present invention an alternate composite video signal, having a different horizontal sync rate than the composite video program source to be transmitted, is utilized to set the synchroniztion rate of the scrambler 10. Moreover, only the IF audio signal from the channel modulator 12 is applied to the scrambler 10. In operation, the scrambler 10 generates a scrambled IF audio signal which is output from an IF audio output terminal 74. The IF video output terminal 76 is grounded through a resistor 78. The scrambled IF audio signal is then returned to the channel modulator 12 where it is combined with the unscrambled IF video signal in a 2-way combiner 80.

The combiner 80 generates a composite signal, which is input via line 81 to the output modulator 62, where this signal is further modulated to the appropriate CATV channel output frequency and output on line 64. As discussed above with respect to FIG. 1, the channel combiner 14 receives the channel output signal and combines this signal with corresponding signals from other premium and non-premium channels to produce the system output on line 66.

In operation of the CATV system utilizing the head-end portion as shown in FIG. 2, a converter/decoder box having its decode circuit jumper cable cut interprets the presence of the scramble signal on the audio carrier as a decode command. The decode circuit than removes the scramble signal from the audio carrier, phase shifts this signal by 180°, and mixes the phase shifted signal with the unscrambled video carrier. This operation is repeated for every premium channel. However, since the video carriers are unscrambled, mixing of the scramble signal with each video carrier serves to scramble an "off-the-air" channel due to the cutting of the jumper cable. Specifically, as noted above the scramble signal has a different time base with respect to the horizontal sync pulses of the received program source due to the use of the alternate composite video input to the scrambler 10. Therefore, these horizontal sync pulses are intermittently affected by the scramble signal to intermittently scramble an "off-the-air" channel. The 15.75 Hz scramble signal also serves to produce a "residual" scrambling component by virtue of this signal being amplitude-modulated with the received unscrambled program source. To the contrary, if the decode circuit jumper cable has not been cut, the decode circuit is only enabled by properly cut premium channel jumper wires, and normal "off-the-air" channels are unaffected by the encoding technique.

Although not shown in detail, the head-end portion of the CATV system according to the present invention includes the circuitry shown in FIG. 2 for each premium channel. The present system is thus advantageous as it does not require any modification or additional circuitry in the converter/decoder box itself. When an unauthorized or defective converter/decoder box exists in the system, the user will receieve the premium channel information, but will be unable to view one or more network broadcast channels. The user will call in to the CATV system operator to report the problem with the network broadcast channels, thus identifying the unauthorized or defective box.

The head-end portion of the CATV system may include the channel modulator 12 as discussed above with respect to FIG. 2, or alternatively, a signal processor for producing the channel output signal. In particular, the channel modulator 12 of FIGS. 1 and 2 is designed to receive a composite video input having a frequency range of 0-5 mHz. The composite video input is generated from a local feed, camera, or earth station, and is converted to any VHF channel by the channel modulator. The signal processing circuit 40 as discussed above with respect to FIGS. 1 and 2 also provides video and audio level control. To the contrary, a signal processor may be utilized in place of the channel modulator 12 of FIGS. 1 and 2. As is well known in the art, a signal processor takes any VHF or UHF input and converts it to any VHF channel output, as well as performing video and audio level control.

Figure 3:
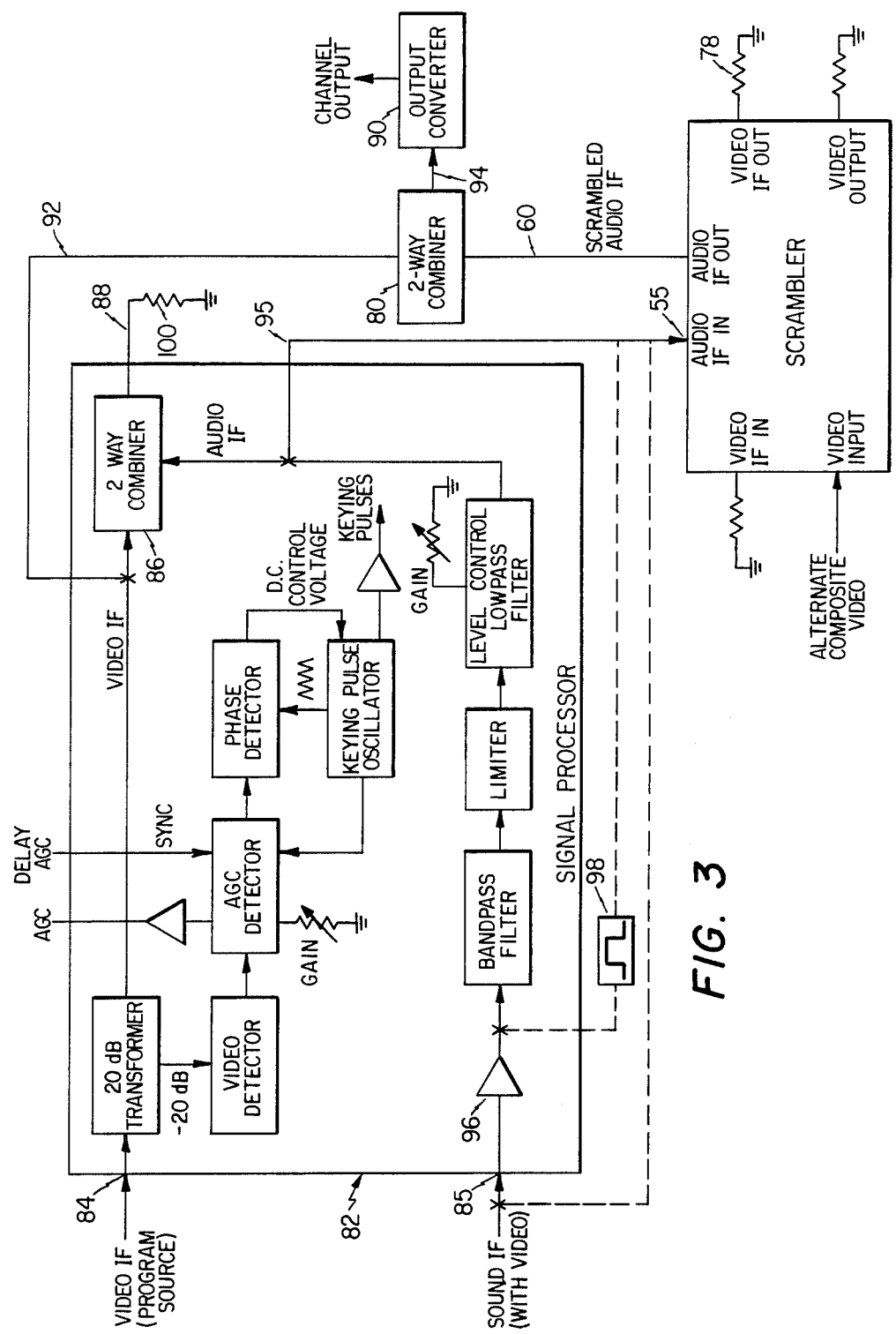
FIG. 3 is a block diagram of the head-end portion of the CATV system of the present invention utilizing a signal processor to generate the channel output.

Referring now to FIG. 3, a block diagram of the head-end portion of the CATV system is shown incorporating signal processor 82. As seen in FIG. 3, the signal processor 82 includes video and audio IF inputs 84 and 85 for receiving video and audio IF signals representing the program source. It should be appreciated that although the signal processor is shown receiving IF signals, this device is capable of receiving program source signals of any freuqency and generating a corresponding VHF output. As seen in FIG. 3, the video and audio IF signals are normally processed separately and combined in a two-way combiner 86, the output of which is then normally applied via line 88 to an output converter 90.

When the signal processor 82 is used according to the method and apparatus of the present invention, however, the IF video signal is intercepted before the two-way combiner 86 and applied via line 92 to the combiner 80. The other input to the combiner 80 is the scrambled IF audio output via line 60 from the scrambler 10. The composite signal output from the combiner 80 is applied via the output line 94 to the input of the output converter 90.

In the preferred embodiment of the invention, the IF audio input 55 to the scrambler 10 is provided by breaking the other input line to the two-way combiner 86 as represented by line 95 in FIG. 3. Alternatively, the IF input may be provided directly from the audio input 85, or from the output of a sound IF amplifier 96 through a bandpass filter 98. These alternate embodiments are represented by the dotted lines in FIG. 3. The bandpass filter 98 is required to ensure that only the audio IF is provided to the scrambler 10. The output line 88 from the two-way combiner 86 is grounded through a resistor 100.

It should be appreciated that the method and apparatus of the present invention may be incorporated into the prior art head-end section of a CATV system with relative ease since internal modifications to the scrambler are not required. As discussed above, the present invention simply requires the separation of the IF audio and video signals in the channel modulator or signal processor, and application of the IF audio signal and an alternate composite video to the scrambler. This technique operates to scramble one or more nonpremium CATV channels if the converter/decoder box is unauthorized or defective.

Although the invention has been described in detail, it is to be clearly understood that the same is by way of illustration and example only and is not to be taken by way of limitation, the spirit and scope of the invention being limited only to the terms of the appended claims.

I claim:

1. A head-end apparatus for a CATV system for identifying unauthorized or defective converter/decoder boxes, comprising:
    channel means for receiving a first program source and generating IF audio and video signals, said first program source having a synchronization rate;
    scrambler means having an input connected to said channel means for receiving said IF audio signal and generating a scrambled IF audio signal having a scramble signal component, said scrambler means having a synchronization rate set by a second program source input thereto, said second program source having a synchronization rate different from said synchronization rate of said first program source; and
    combiner means connected to said channel means and said scrambler means for receiving said IF video signal and said scrambled audio signal, respectively, and generating a composite signal;
    said channel means connected to said combiner means for receiving said composite signal and generating a CATV channel output signal, whereby an unauthorized or defective converter/decoder box applies said scramble signal component of said scrambled IF audio signal to said IF video signal to scramble a non-premium channel of the CATV system.

2. The head-end apparatus for a CATV system as described in claim 1 wherein said channel means includes first and second modulators, said first modulator for receiving said first program source and generating said IF audio and video signals, said second modulator connected to said combiner means for receiving said composite signal and generating said CATV channel output signal.

3. The head-end apparatus for a CATV system as described in claim 2 wherein said input of said scrambler means include a first terminal connected to said first modulator for receiving said IF audio signal.

4. The head-end apparatus for a CATV system as described in claim 3 wherein said input includes a second terminal for normally receiving an IF video signal, said scrambler means including a resistor connected between said second terminal and ground.

5. The head-end apparatus for a CATV system as described in claim 1 wherein said scrambler means includes a video output, and a resistor connected between said video output and ground.

6. The head-end apparatus for a CATV system as described in claim 1 wherein said scrambler means includes an IF output having first and second terminals, said first terminal connected to said combiner means for applying said scrambled IF audio signal thereto.

7. The head-end apparatus for a CATV system as described in claim 6 wherein said scrambler means further includes a resistor connected between said second terminal and ground.

8. A head-end apparatus for a CATV system for identifying unauthorized or defective converter/decoder boxes, comprising:
    a channel modulator, including a signal processing circuit and a first modulator, for receiving a first program source and generating IF audio and video signals, said first program source having a synchronization rate, said channel modulator also including a second modular;
    a scrambler having an IF input connected to an output of said first modulator for receiving said IF audio signal and generating, at an IF output thereof, a scrambled IF audio signal having a scramble signal component, said scrambler having a horizontal synchronization rate set by a second program source input thereto, said second program source having a synchronization rate different from said synchronization rate of said first program source; and
    a combiner connected to said IF output of said scrambler and the output of said first modulator for receiving said scrambled IF audio signal and said IF video signal, respectively, and generating in response thereto a composite signal;
    said second modulator connected to said combiner for receiving said composite signal and generating a CATV channel output signal, whereby an unauthorized or defective converter/decoder box in said CATV system applies said scramble signal component of said scrambled IF audio signal to said IF video signal to scramble a non-premium channel of the CATV system.

9. The head-end apparatus for a CATV system as described in claim 8 wherein said IF input of said scrambler includes a video input terminal connected to ground through a resistor.

10. The head-end apparatus for a CATV system as described in claim 8 wherein said IF output of said scrambler includes an IF video output terminal connected to ground through a resistor.

11. A method for idnetifying unauthorized or defective converter/decoder boxes in a CATV system having a scrambler for encoding a premium channel, comprising the steps of:
    receiving a first program source representing said premium channel and generating IF audio and video signals in response thereto;
    applying a second program source to said scrambler to set the synchronization rate thereof, said second program source having a synchronization rate different from the synchronization rate of said first program source;
    applying said IF audio signal to the scrambler to generate a scrambled IF audio signal having a scramble signal component;
    combining said IF video signal and said scrambled IF audio signal to generate a composite signal; and
    generating a CATV channel output signal from said composite signal, whereby an unauthorized or defective converter/decoder box in said CATV system removes said scramble signal component from said scrambled IF audio signal, and applies said component to said video IF signal to scramble a non-premium channel of the CATV system.

* * * * *